United States Patent [19]

Cusson

[11] Patent Number: 5,343,851
[45] Date of Patent: Sep. 6, 1994

[54] TRANSFORMER HEAT GENERATING ASSEMBLY

[76] Inventor: Robert Cusson, 41 2° Avenue, Delson, J0H 1G0, Quebec, Canada

[21] Appl. No.: 92,870

[22] Filed: Jul. 19, 1993

[51] Int. Cl.⁵ .......................................... F24C 15/08
[52] U.S. Cl. ...................................... 126/4; 126/9 R; 126/41 R; 126/100
[58] Field of Search ............... 126/4, 41 R, 100, 9 R, 126/9 B

[56] References Cited

U.S. PATENT DOCUMENTS

| | | |
|---|---|---|
| 2,237,081 | 4/1941 | Owens . |
| 2,907,316 | 10/1959 | Windust . |
| 3,783,855 | 1/1974 | Newinger . |
| 3,791,368 | 2/1974 | Hunt . |
| 4,681,083 | 7/1987 | Shu .................................. 126/41 R |
| 5,203,316 | 4/1993 | Pritchett ............................ 126/9 R |

Primary Examiner—Carroll B. Dority
Attorney, Agent, or Firm—Pierre Lespérance; Francois Martineau

[57] ABSTRACT

The transformer heating unit can be transformed into six different modes, namely:

a stove, a cooking oven, a roaster, a barbecue grill unit, a foodstuff smoking unit, and an indoor space heating furnace.

The whole transformer unit is enclosed into a compact, box-like casing, which can be deployed into either of the six modes. In its furnace mode, its combustion gas outlet port is coupled to an exhaust flue pipe, for controlled escape of combustion gases outwardly of the room where the occupants are located, whereby smoke intoxication is prevented.

6 Claims, 6 Drawing Sheets

TRANSFORMER HEAT GENERATING ASSEMBLY

FIELD OF THE INVENTION

This invention relates to multiple-purpose cooking assemblies, which can be easily transformed into a variety of heat-generating units such as barbecue units, space heaters, ovens, and the like.

BACKGROUND OF THE INVENTION

The great appeal of outdoor activities during warm summer months means that there is a demand for related commodities. A preferred such activity is cooking foodstuff outside of the house, in the garden for example, over a barbecue grill. Typically, the heating fuel for these barbecue grills is charcoal; or, if trekking in isolated areas, locally available wood chips, or propane fuel (carried by the trekker) may be used.

Those seeking better value for their investment have developed the concept of transformer heating units, i.e. a single integral unit that can be easily transformed into various alternate modes. Typical of these modes are: foodstuff cooking units; radiating space heaters; frying, baking, steaming, roasting, and smoking units; for charcoal broiling; and including complementary means to serve with the cooking mode as a windbreak, as a dishpan or as a washpan.

Transformer heat-generating portable units have been known for a number of years. Such transformer units date back at least as early as the heating unit disclosed in U.S. Pat. No. 2,237,081 issued Apr. 1, 1941 to the *Owens Smokeless Orchard Heater inc.* corporation.

U.S. Pat. No. 2,907,316 issued in 1959 to Frank Windust further discloses a camp stove which can be transformed into a cooking unit or as a stove for use inside a tent.

U.S. Pat. No. 3,791,368 issued in February 1974 to William HUNT discloses a multi-purpose cooking assembly, which can be alternately used as a stove, as a griddle, as a toaster, as a pressure cooker, as a charcoal broiler, and for baking, steaming, roasting, or smoking foodstuff. This cooking assembly can be easily transported like a suitcase. It boasts a propane burner assembly for connection to a propane fuel reservoir, and/or alternate fuel source such as charcoal briquet in a suitable carrier, and/or prepackaged wood chips used when smoking the food. As suggested in FIG. 3 of the drawings in this latter patent, a variety of griddle, grill, carriers, pans, and other paraphernaliae are included as prepackaged detachable elements inside this cooking assembly, for use when necessary. For transport, these elements are generally nested into one another, as illustrated in FIG. 2, whereby support means 34, 38, 60 releasably interconnect these elements.

In U.S. Pat. No. 3,783,855 issued in January 1974 to Vann NEWINGER, there is disclosed a heat-radiating unit 12 pivotally mounted into a drawer-like casing. One face 62 of the unit 12 forms a grate made of heavy wire mesh, while the opposite face 58 of unit 12 forms a flat panel. When radiator 12 is pivoted to a first position where face 58 becomes horizontal and faces upwardly, foodstuff can be heated or fryed thereon; when radiator 12 is pivoted half a turn to a second position whereby face 62 becomes horizontal and faces upwardly, a barbecue surface is formed; and when radiator 12 is oriented vertically, as illustrated in FIG. 1, it becomes a space heater.

As we have seen, these transformer heating/cooking units are usually destined for outdoor use. Indeed, the combustion gases generated by the combustion of the fuel (charcoal or propane) are simply released to the air, without being channeled out through specific flue means. In the garden or in the woods, this has no drawback; but if one would like to use such a cooking/heating transformer unit inside a house or inside a flexible sheet tent, very real safety hazards would result, namely, severe intoxication (and possibly even death) from combustion gases (e.g. carbon monoxyde) smoke inhalation.

OBJECTS OF THE INVENTION

An object of the invention is to extend the applications of existing transformer cooking/heating units, to indoor use.

A more specific object of the invention is to provide a transformer heating unit, having six different modes, namely: as a stove, a cooking oven, a roaster, a barbecue grill unit, a foodstuff smoking unit, and as an indoor gas-burning space heater.

SUMMARY OF THE INVENTION

Accordingly with the objects of the invention, there is disclosed a transformer heating unit defining:
 (a) a main self-standing frame, defining a generally box-like enclosure having a bottom tray and a top mouth and air feed means for enabling outside air flow over said tray within said enclosure;
 (b) independant, adjustable, heat-generating means, mounted spacedly over said tray, for self-generating heat within said enclosure;
 (c) first means, to be combined with said main frame for transforming said heating unit into a an indoor space-heating furnace unit, said first means including flue means for discharge of combustion gases generated by said heat generating means at a distance from said heating unit;
 (d) second means, to be combined with said main frame for transforming said heating unit into a cooking oven;
 (e) third means, to be combined with said main frame for transforming said heating unit into a roaster;
 (f) fourth means, to be combined with said main frame for transforming said heating unit into a barbecue grill unit; and
 (g) fifth means, to be combined with said main frame for transforming said heating unit into a foodstuff smoking unit;
wherein said first to fifth means are all detachably mounted together into said main frame for transportation or storage.

DETAILED DESCRIPTION OF THE INVENTION

Figure 5:
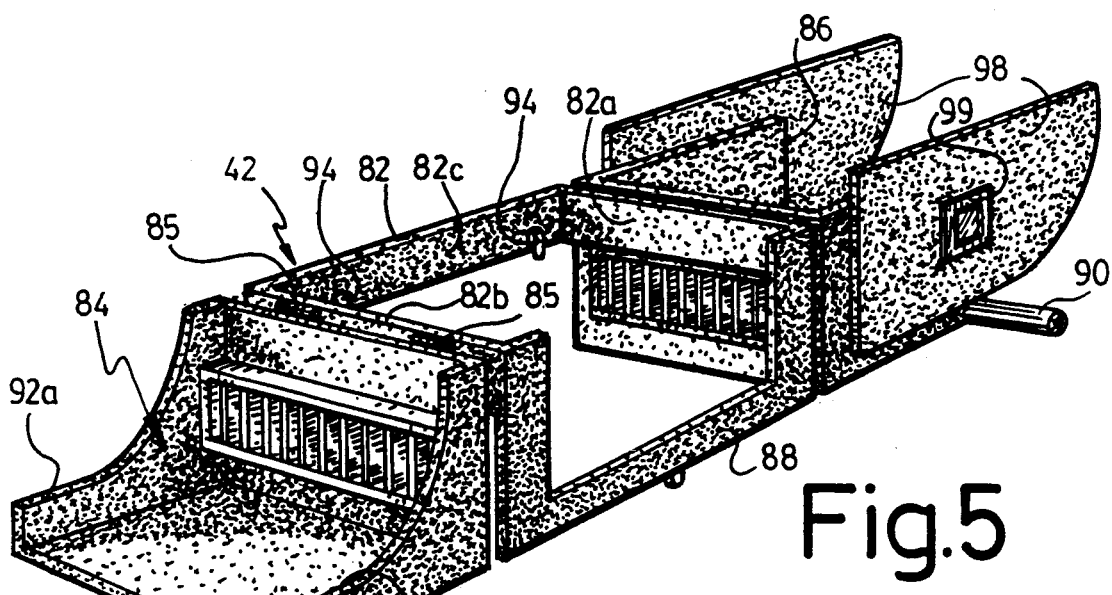
FIG. 5 is a perspective view of the dismantleable cover portion used in the barbecue grill mode of FIGS. 3–4, shown in extended condition.
Figure 6:
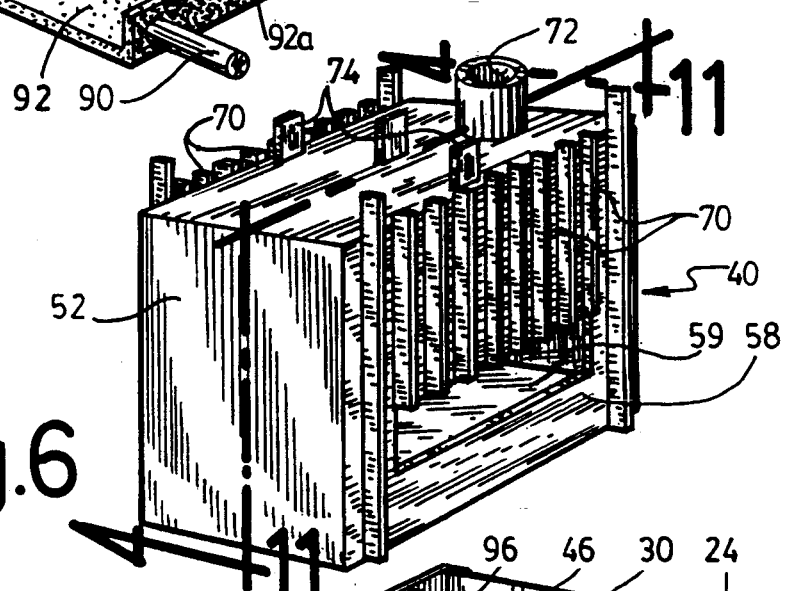
FIG. 6 is a perspective view of the fire box forming part of the stove mode of the present transformer unit.
Figure 7:
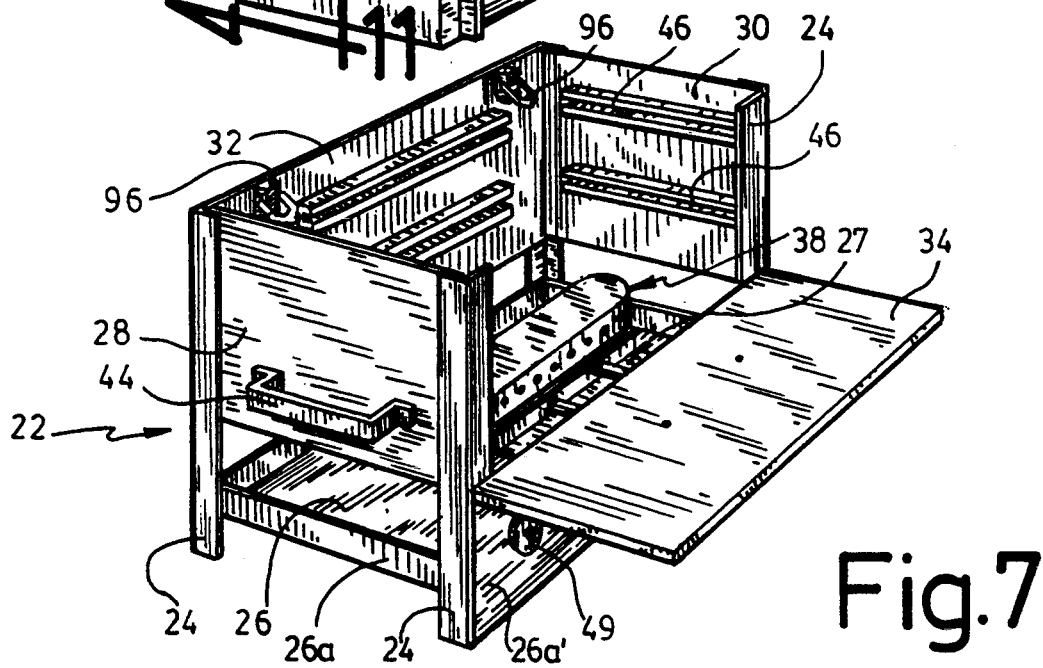
FIG. 7 is a perspective view of the self-standing main frame forming part of all the six heating unit modes of the present invention, and showing a propane gas burner being supported spacedly over the bottom debris-collecting, removable tray.

FIGS. 5 to 7 illustrate the three main elements of the present transformer unit 20. Indeed, the combination of elements illustrated in FIGS. 5, 6 and 7 contain the three main detachable elements of the present invention. More particularly, FIG. 7 illustrates the main, self-standing box-like frame 22 of the transformer unit 20, defining four cross-sectionally L-shape, upright corner legs 24, a removable tray 26 supported over ground by tracks 26a being anchored to the legs 24, two lateral fixed side walls 28 and 30 and a rear side wall 32 being edgewisely anchored to corresponding pairs of successive legs 24, and a front door panel 34 being hingedly mounted by pivot means 36 (FIG. 8) at its bottom edge to the mid portion of the two front legs 24.

Panel 34 is pivotable manually by grasping a front handle 35. Pivot means 36 are upwardly offset from the tray 26. A flooring panel 27 is adapted to support a propane burning unit 38; panel 27 extending spacedly over tray 26 and being edgewisely anchored to wall 32 and 26a and being preferably pierced by a number of air circulation bores (not illustrated).

Fixed side walls 28-32 are adapted to enclose and are correspondingly dimensioned to receive a firebox 40 (illustrated in FIG. 6), the firebox being supported by the permanent flooring 27.

Figure 11:
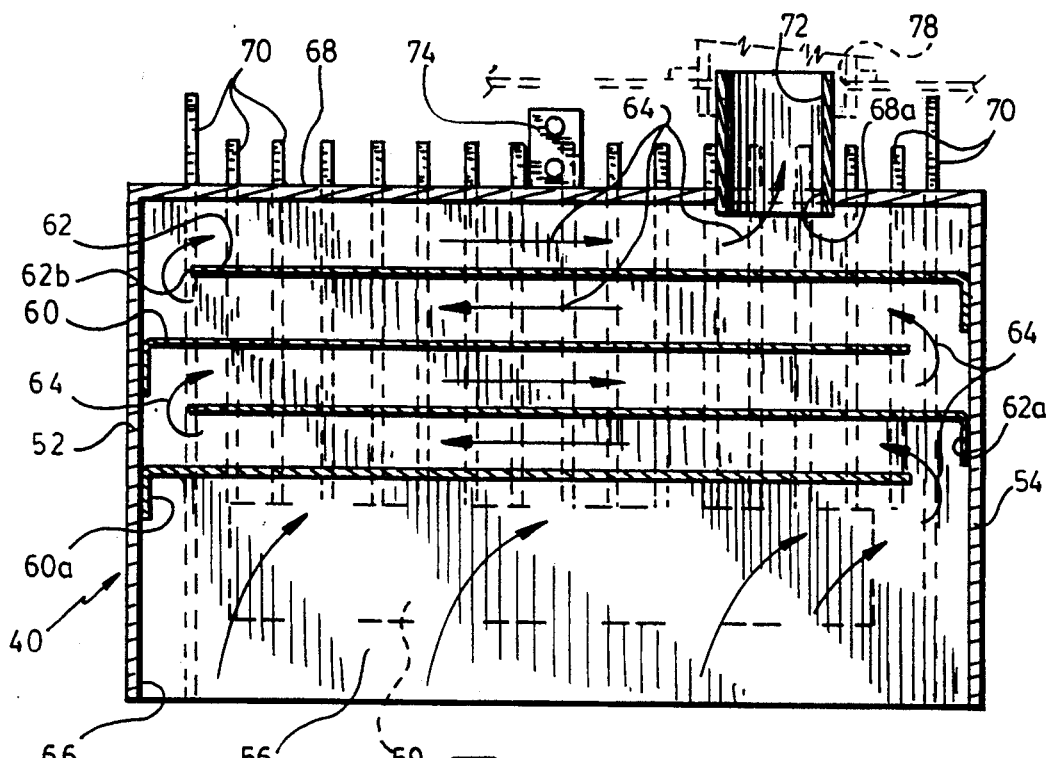

Firebox 40 has a lower glazed window 59 and is bottomless (see FIG. 11).

The extensible cover part 42 illustrated in FIG. 5 is adapted to fit against the external face of the side walls 28-32 (see FIG. 8), but inwardly of the door 34.

Pivotally mounted door 34 can be used in opened position (FIG. 8a) to look at the flame of burner unit 38 through window 59, or as a shelf to hold foodstuff, to be cooked (the firebox 40 must be removed in this case, when the oven mode is selected). However, for large foodstuff portions such as poultry, the cover part 42 is removed for roasting, as suggested in FIG. 9.

Tray 26 is edgewisely freely supported by cross-sectionally L-shape tracks 26a, these tracks 26a being anchored at their end portions to legs 24. As illustrated, the tracks 26a extend for example short of the respective side walls 28-32, whereby a gap is defined therebetween, these gaps forming air intake ports for feeding the combustion of propane. However, it is understood that, in another model within the scope of the invention, tracks 26a could very well merge with corresponding walls 28-32, provided a number of small through-bores (not illustrated) are made into the lower portions of walls 28-32 and/or into the flooring 27 above the tray 26, so as to enable ambient air to feed the propane gas combustion generated by the propane burner 38 resting over the tray 26. Also, the front track, 26a', may e.g. extend further upwardly than the remaining tracks 26a, to edgewisely freely abut with the bottom edge of the hinged door 34, and also downwardly, to the ground G.

Figure 3:
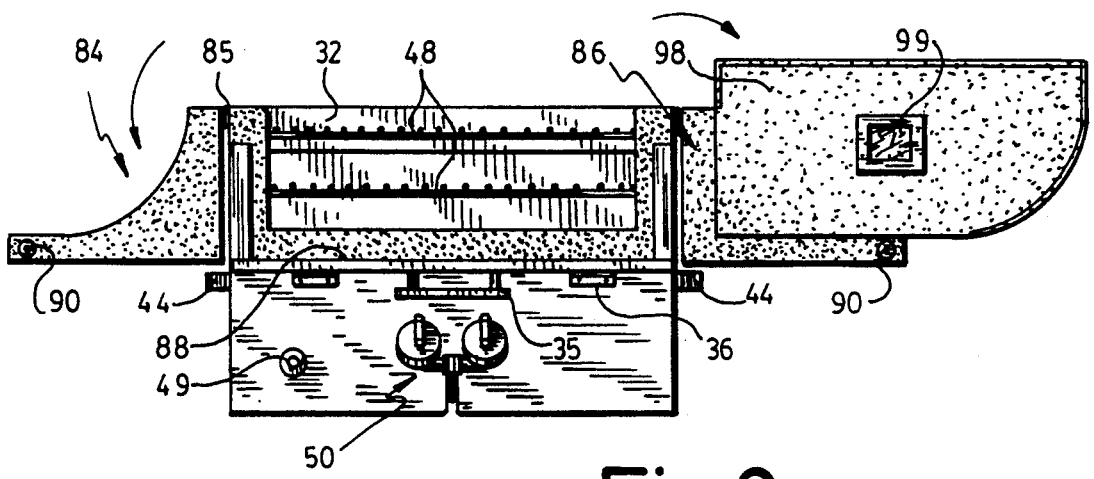
FIGS. 3 and 4 are front elevational and top plan views, respectively, of the barbecue grill mode of the transformer unit according to the invention.

To facilitate handling of the main frame 22 of the transformer unit, handles 44 are provided, projecting outwardly from side walls 28 and 30. The inner faces of side panels 28-32 further carry horizontally extending and registering rails 46, (see FIGS. 7 and 10) e.g. two vertically spaced rails each, for slidingly receiving grills 48, such as barbecue grills (see also FIGS. 3 and 4), or roasting trays 110 (see FIG. 9).

The bottom tray 26 is releasably mounted by tracks 26a in between the supporting legs 24, particularly in view of periodic cleaning purposes (i.e. removing ash, cinders, or other debris having accumulated therein). Cross-sectionally L-shape tracks 26a are anchored to the inside V-shape face of the four supporting legs 24, and the tray 26 made to freely abut thereon at its four corner portions, whereby the tray be freely upwardly removable therefrom. Tray removal could be done by upwardly tilting one end thereof, thus enabling release of the tray from the opposite side supporting tabs; or these support means could also be for example small notches (not illustrated) about two consecutive side legs 24, 24, for example the two "rear" legs 24, 24, of the heating unit 20, to enable horizontal sliding motion of the tray 26 through these notches.

Propane burner unit 38 is operatively controlled through a control knob assembly 50 (see FIGS. 9 and 10) projecting outwardly from the front flange 26a', beneath door 34.

Fire box 40 is shown in perspective view in FIG. 6 and in cross-section in FIG. 11. Fire box 40 is box-shaped, including two opposite side walls 52 and 54, and front and rear walls 58 and 56. Front wall 58 includes a lower window 59 within which is fitted a glass window pane. Side walls 52 and 54 carry each a number of spaced, parallel, horizontally-extending plates 60, 62, respectively, e.g. two for each side wall 52 and 54 as illustrated in FIG. 11. Each plate 60 and 62 straddles the front and rear walls 58 and 56, and defines a right-angle inner flange 60a, 62a, anchored to walls 52 and 54 respectively, and a free end edge 60b, 62b, extending short of walls 54 and 52, respectively, whereby a circonvoluted smoke passageway (arrows 64) is formed therebetween. Sinusoidal passageway 64 works as a heat exchanger, dissipating heat laterally through walls 52-58, as the warm combustion gases move naturally upwardly through the firebox.

In operation, the combustion gases from the propane gas burner 38 first engage through the large bottom open mouth 66 of the firebox 40, then along the sinusoidal pathway 64, to exit through a small outlet 68a made through the top wall 68 of firebox 40. (Top wall 68a edgewisely merges with the four side walls 52–58) Preferably, a plurality of thermally radiating fins 70 are edgewisely anchored to the exterior face of walls 56 and 58, along a vertical axis and spaced from one another. Fins 70 promote heat dissipation, outwardly from the firebox 40.

A flue pipe 72 is fitted at its bottom end into smoke outlet 68a, for conveying combustion gases away from the immediate surroundings of the heating device 20, e.g. through and beyond the roof of a building into which the heating unit 20 is located, so as to prevent smoke intoxication by the occupants.

In FIG. 6, the firebox 40 preferably includes two horizontally spaced apart top ears, 74, being edgewisely anchored to the top edges of fin walls 56 and 58. Ears 74 are provided to receive a thermally insulated handle, not shown, to be able to safely hand-grasp the firebox 40 for displacement thereof, particularly when the firebox is very hot. Also, the top wall 76 (FIG. 8a) thereof should be flat and horizontal in operative position, to be able to directly support cans and the like for heating foodstuff inside the can, once a flap 84 or 86 of the cover part 42 has been opened to clear the way for the can.

Firebox 40 is accordingly used only when the transformer unit 20 is in its space heating (furnace) mode, or in the stove mode. The firebox 40 becomes operative upon being releasably mounted inside the main self-standing frame 22 illustrated in FIG. 7 (the grills 48 supported by tracks 46 must have been previously removed therefrom). The flue pipe 72 is fitted to the gas outlet 68a of the firebox only after the firebox has been inserted inside the enclosure of the box-like frame 22, through a corresponding aperture 78 made in wall 92 of hinged flap 86 of the cover part 42 (said aperture 78 being normally releasably closed by a slitted plug member, 80, see FIG. 8a).

Figure 10:
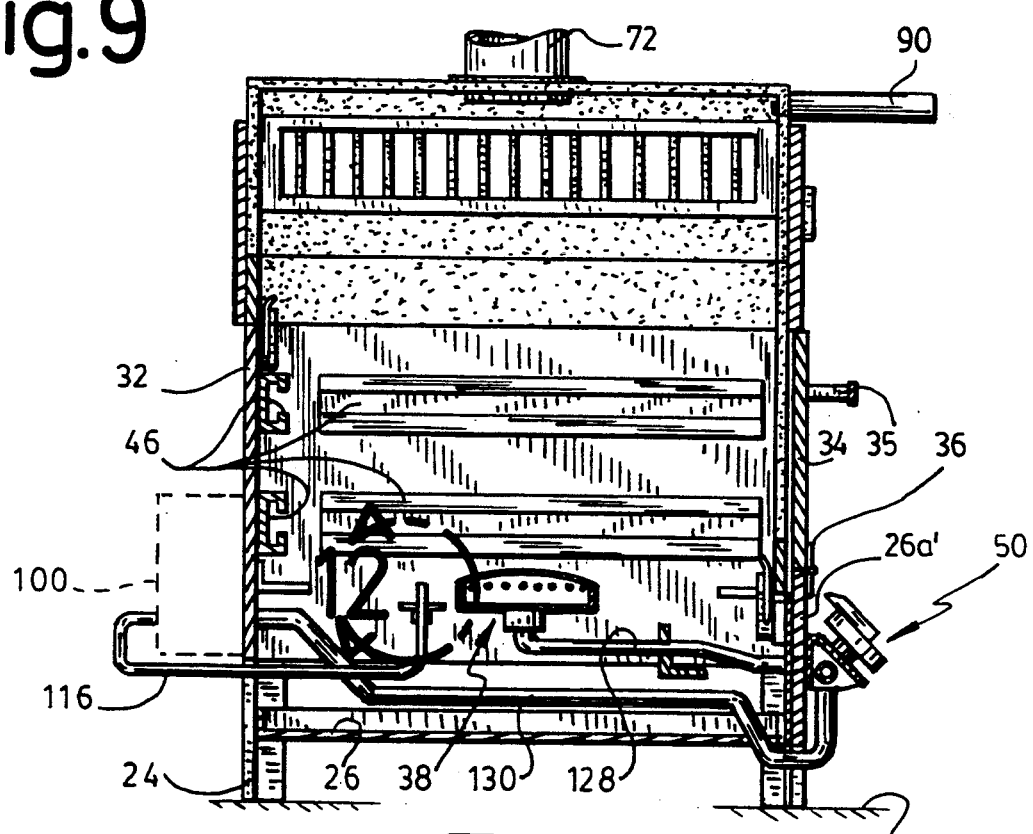
FIGS. 10 and 11 are enlarged sectional views taken along lines 10—10 of FIG. 2 and 11—11 of FIG. 6, respectively.

Preferably, and as suggested in FIG. 10, a thermocouple is provided as a safety measure in preventing accidental unignited combustion gas outflow of the pilot unit (FIGS. 12–14) or the propane gas burner 38; i.e., as soon as the fire stops, the propane gas feeding line is automatically closed.

The cover unit 42 illustrated in FIG. 5 is used as a cover when the present heating unit 20 is in the following modes:
oven smoking unit or barbecue unit;
or used as a double-walled thermally insulating member, when associated with the firebox 40 in the space heating furnace mode.

Cover unit 42 includes a central open frame, 82, of U-shape, and two pivotable flaps, 84 and 86, hingedly mounted at 85 to the two opposite legs 82a and 82b of the frame 82. Cover portions 84 and 86 are pivotable from an opened condition, illustrated in FIGS. 3–5 where these two cover portions 84 and 86 extend in opposite directions; through a partially closed condition, illustrated in FIGS. 8–8a, in which cover portion 86 is turned half a turn to come within open frame 82 while cover part 84 remains in its said open condition; to a fully closed condition, illustrated in FIGS. 1–2, where both cover flaps 84 and 86 are pivoted inwardly to fit within the open central frame 82. Frame 82 further includes a U-shape extension 88, projecting transversely from the outer ends of the legs 82a and 82b. U-extension 88 forms along its two side legs 82a, 82b, an abutment member for edgewise abutment by and for defining the limit condition of the cover flaps 84 and 86 in their fully opened (extended) positions.

Preferably, the lateral cover flaps 84 and 86 each includes a vertical, end grilled outlet, 87, operative in the space-heating furnace mode (FIGS. 1–2); and a front handle, 90, for grasping the front cover flap in view of pivoting same. This is desirable in that the cover portion 84 and 86 is envisioned to be made from a metallic compound, which is thus thermally conductive and thus direct physical contact therewith would otherwise mean severe skinburns during operation of the heating unit 20.

Each cover flap 84 and 86 defines a generally L-shape in cross-section, with the lower leg forming a horizontal foodstuff-receiving tablet, 92, in the opened condition of these cover flaps. Preferably, this tablet 92 defines upturned front and rear flanges, 92a, 92a.

Figure 8:
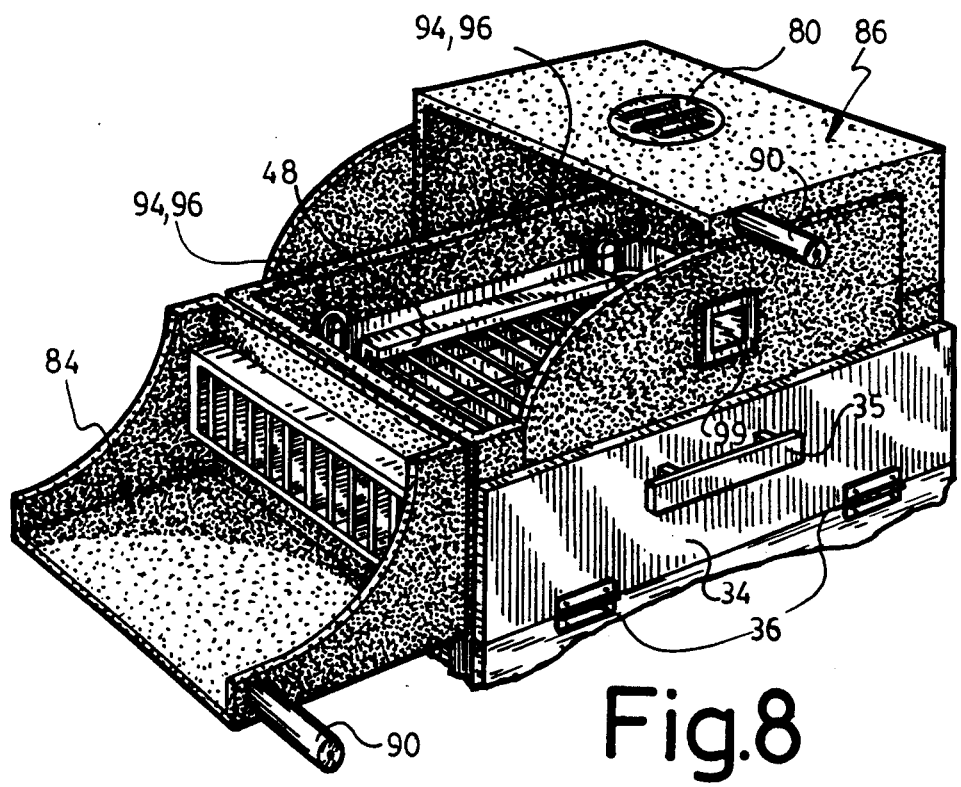
FIGS. 8 is an isometric view of the combined oven, barbecue grill and smoking unit modes of the invention.
Figure 8A:
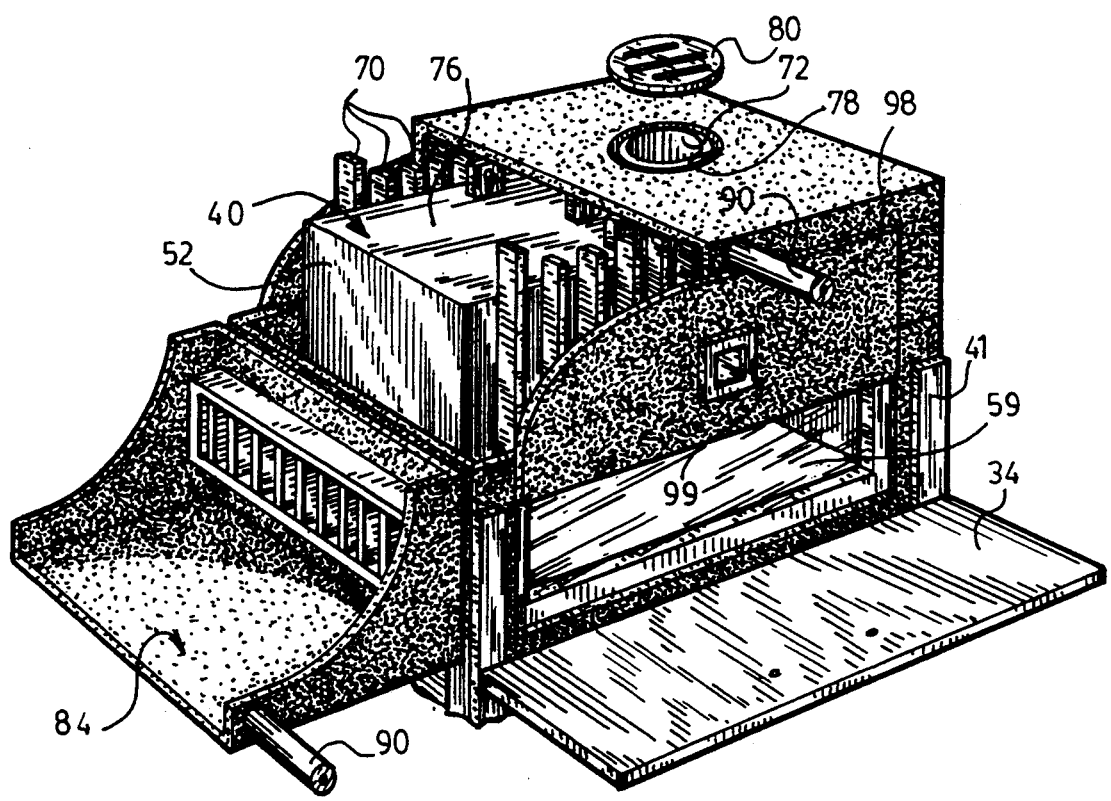
FIG. 8a is an isometric view of the stove mode of the invention, with one flap of the cover portion being opened so as to be used, when the firebox has been removed, as a foodstuff-supporting tablet.

As illustrated in FIGS. 5, 7 and 8, the base leg 82c of the main U-shape frame part 82 of the cover 42 carries a pair of male latch members 94, and the upper edge of the inner face of the rear wall 32 of the self-standing casing 22 carries a pair of complementary female latch members 96, whereby members 94 and 96 constitute an interlocking latch means for releasably interconnecting the cover member 42 into the enclosure of the self-standing casing 22.

Figure 1:
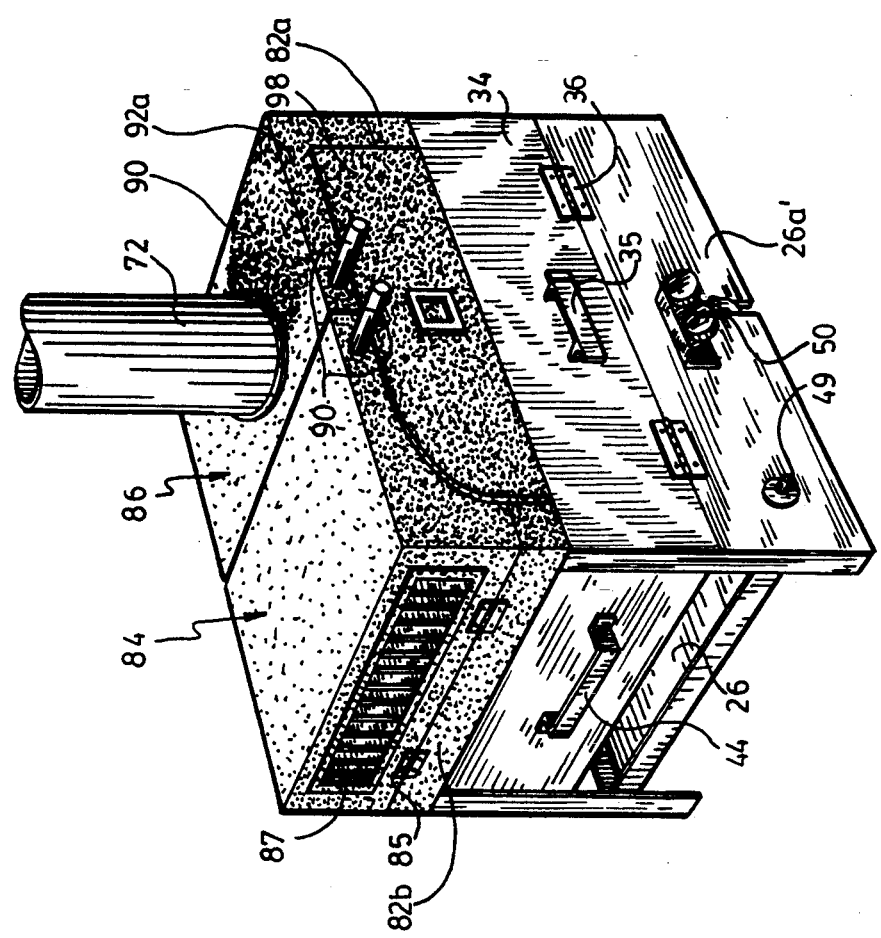

As illustrated in FIGS. 1 and 5, cover flap 86 further includes a pair of approximately semi-circular extension panels, 98, (the inner edge thereof being however straight, as illustrated) being fixedly carried on the exterior side of and laterally projecting from the front and rear flanges 92a, 92a. These panels 98 are larger than the flanges 92a, and each of these panels 98 is specifically shaped to conformingly match the edgewise contour of the corresponding pair of front or rear flanges 92a from the cover flaps 84 and 86, when the cover flaps 84 and 86 are in their fully closed condition illustrated in FIGS. 1 and 2 of the drawings. Therefore, it is understood, as clearly shown in FIG. 1, that, in the space heating furnace mode of the invention, the front wall of the furnace is formed of the combination of panels 92a, 98, 34, 26a', and of the front ends of legs 82a and 82b, which, taken together, form a coextensive full panel member completely concealing the enclosure of the furnace assembly 20. A thermometer 99 is mounted in panel 98.

The oven thus comprises a propane gas burner, to which is preferably coupled a thermostatic control box 100 (FIG. 2) with a heat probe 102 for selection of the desired temperature. A thermocouple, and an electronic starter 49 are also further provided.

The thermostatic control box will start the fire and stop it in an automatic fashion, thereby enabling use of the transformer heating unit 20 into the space-heating furnace mode thereof (when frame 22 is combined with the fire box 40).

Figure 9:
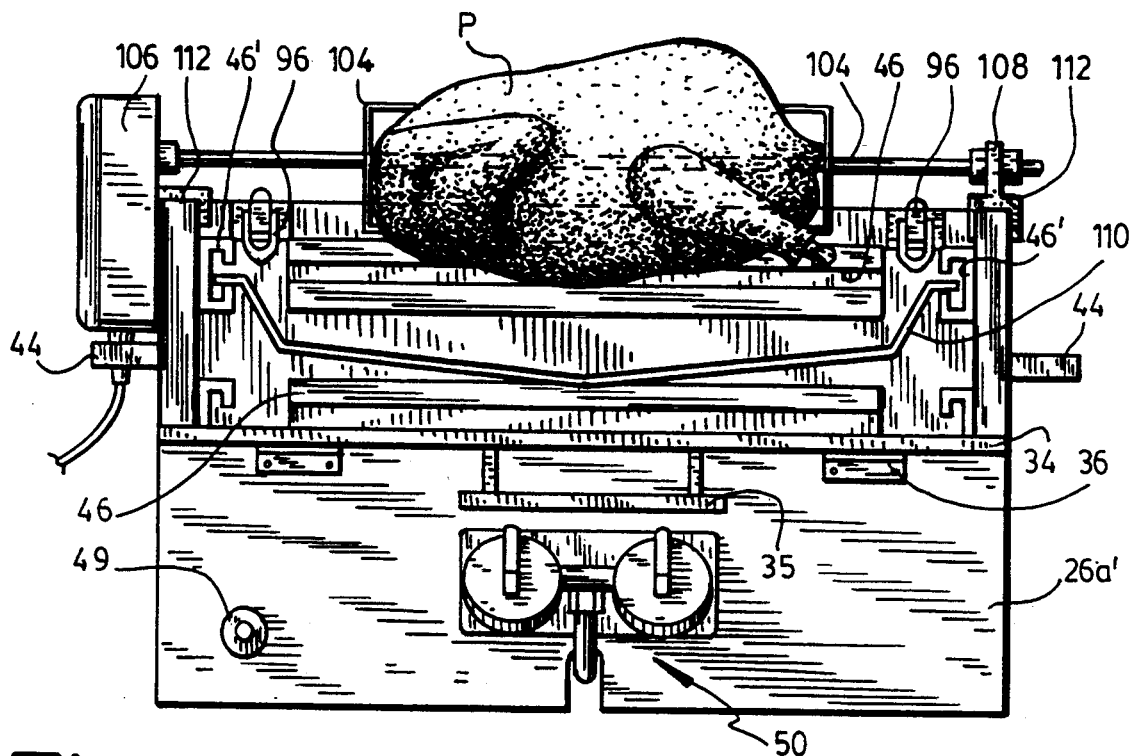
FIG. 9 is a front elevation of the roaster mode of the present transformer unit.

FIG. 9 illustrates the roasting mode of the transformer heating unit 20. The conventional rotatable fork rod 104 is power rotated by the motor unit 106 at one end and freely journalled at its opposite end to a yoke member 108. Fork rod 104 may embroach e.g. a poultry P, spacedly over tray 26. A generally concave grease-collecting pan 110 is releasably installed beneath the fork rod 104, above tray 26, and being edgewisely engaged into a pair of opposite lateral tracks 46'. Motor casing 106 and yoke member 108 are both anchored by anchoring members 112, 112, to the top edge of side walls 28 and 30, respectively.

FIGS. 10 and 12–14 illustrate the smoking mode of the present transformer unit according to the invention. A pilot unit 114 is installed at a position proximate the propane gas burner, 38, at the outlet end of a propane gas delivery line, 116. A cylindrical coupling member 118, diametrally larger than pilot 114, is fitted to the downstream (outlet) end of the line 116, coaxially around the pilot unit 114. A large cup member 120 is further provided, defining a bottom wall 120a and a cylindrical wall 120b, the cylindrical wall being edgewisely integral to the bottom wall 120a. A boring 120c is made centrally of bottom wall 120a, coaxially with cylinder 120b, and defining a radially inner diameter matching the external diameter of the cylindrical coupling member 118 for friction-fit interlocking engagement therebetween.

Cup member 120 encloses wood chip particles, C, in such a quantity that the height achieved by these wood chips does not extend beyond the top mouth of coupling member 118, to prevent undesirable wood chip overflow inside the coupling member 118 and into pilot unit 114 (the wood chip would ignite and inflame, rather than simply smoking). The top open mouth of cup cylinder wall 120b is releasably closed by a cap, 122. Cap 122 includes a plurality of small through-bores 124, through which smoke generated by unignited but warmed up wood chips C will escape. Preferably, a handle, not shown, is mounted to cap 122 to facilitate its handling.

Cylindrical coupling 118 further defines radially disposed, combustion air intake ports 118a at its lower portion, below of and clearing the boring 120c, for sustaining the flame of pilot unit 114.

Figures 12, 13, 14:
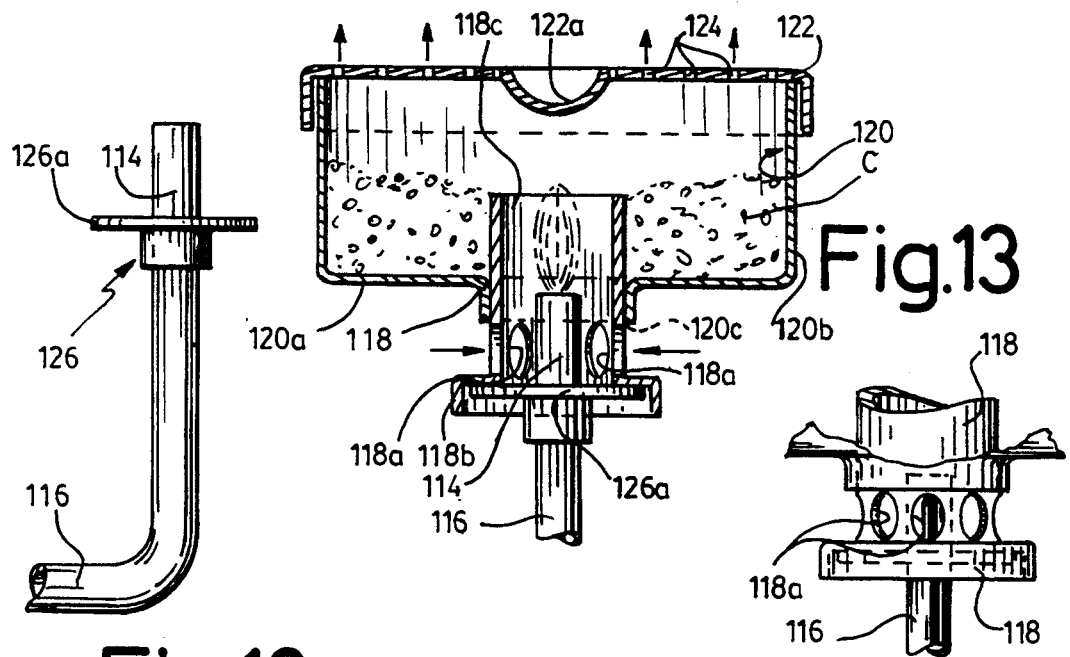
FIG. 12 is a view at an enlarged scale of the pilot unit appearing in the area circumscribed by arrow 12 in FIG. 10.
FIG. 13 is a cross-section at an enlarged scale of the smoking element of the present transformer unit, being fitted to the pilot unit shown in FIG. 12, and illustrating the wooden chips to be smoked and the pilot flame.
FIG. 14 is a cut away elevation of the lower portion of the collar member surrounding the pilot unit in the smoking element of FIG. 13, particularly showing the air intake ports.

As illustrated in FIGS. 12–13, pilot unit 114 is coupled to the propane gas line 116 through a coupling means 126, including a discoid plate 126a having a large radius. Discoid plate 126a supports the bottom edge of the upright cylindrical coupling 118, via a radially-outwardly diverging annular projection 118b at the bottom edge of cylinder 118, projection 118b forming an annular seat for the coupling 118.

As illustrated in FIG. 13, the cylindrical tube 118 around the pilot unit 114 extends short of the cap 122. However, it should be understood that, in an alternate mode within the scope of the invention, this cylinder 118 could extend up to and with its top mouth 118c abutting against this bored cover of the smoking unit (not illustrated). This embodiment would be advantageous, in that it would positively prevent the pilot flame from generating full ignition of the wood chips C, whereas one needs only to smoke them.

Preferably, cap 122 includes a central inturned convex projection, 122a, in axial register with cylinder tube 118 and of an external diameter matching that of the internal diameter of tube 118 so that, in a topmost condition of tube 118 abutting against cap 122, cap projection 122a will engage through the top mouth 118c of tube 118, in view of substantially preventing the flame of pilot unit 114 from igniting the wooden chips C.

Figure 2:
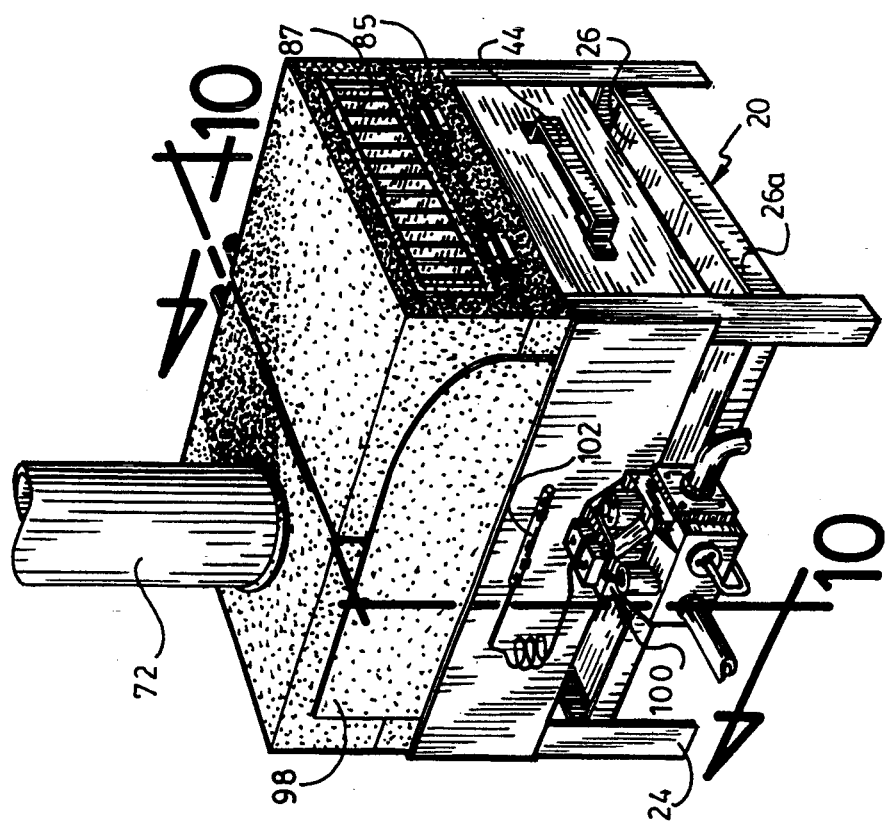
FIGS. 1 and 2 are front and rear perspective views, respectively, of the indoor space heating furnace mode of the present transformer unit.
Figure 4:
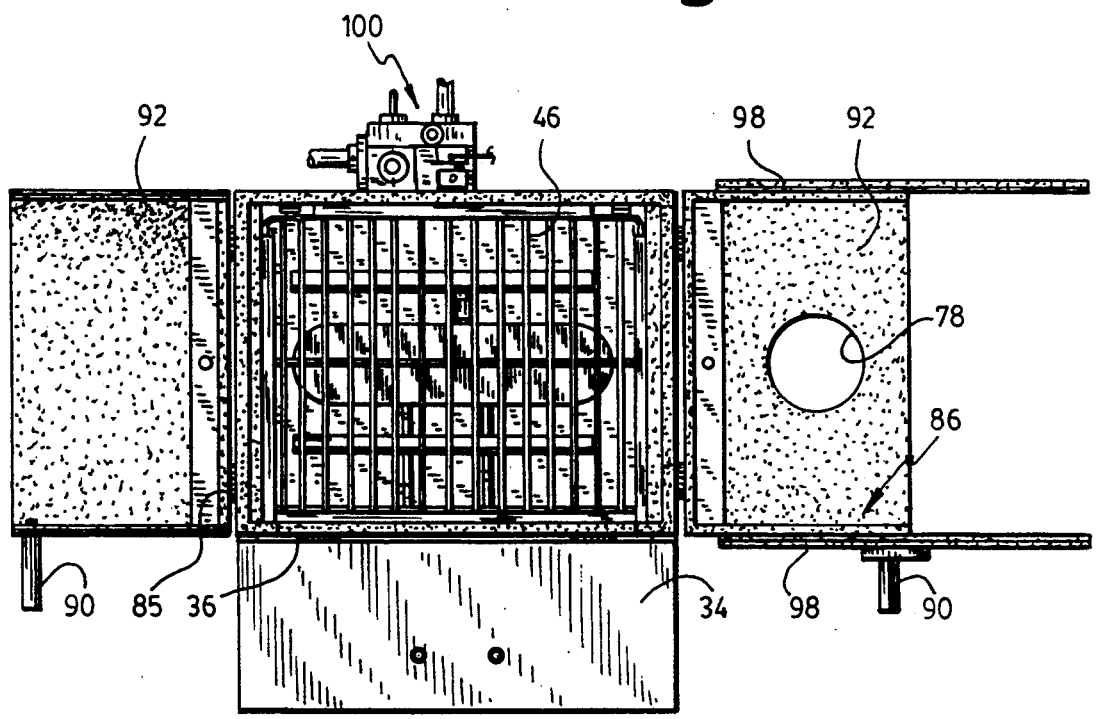

It will be readily understood by those skilled in the art that the propane gas delivery line 116 is to be operatively connected to the electrostatic control box, 100 (FIGS. 2, 4 and 10). Front control knob 50 is connected to propane burner 38 by line 128, and to the control box 100 by line 130. Control box 100 is itself connected to a propane gas reservoir, not illustrated.

I claim:

1. A transformer heating unit defining:

(a) a main self-standing frame, defining a generally box-like enclosure having a bottom tray and a top mouth and air feed means for enabling outside air flow over said tray within said enclosure;
(b) independant, adjustable, heat-generating means, mounted spacedly over said tray, for self-generating heat within said enclosure;
(c) first means, to be combined with said main frame for transforming said heating unit into an indoor space-heating furnace unit, said first means including flue means for discharge of combustion gases generated by said heat generating means at a distance from said heating unit;
(d) second means, to be combined with said main frame for transforming said heating unit into a cooking oven;
(e) third means, to be combined with said main frame for transforming said heating unit into a roaster;
(f) fourth means, to be combined with said main frame for transforming said heating unit into a barbecue grill unit; and
(g) fifth means, to be combined with said main frame for transforming said heating unit into a foodstuff smoking unit;

wherein said first to fifth means are all detachably mounted together into said main frame for transportation or storage.

2. A transformer unit as defined in claim 1, wherein said first means includes a firebox member, said firebox member being fully engaged into said main casing enclosure and having integral heat exchanger means including a plurality of external heat dissipating fin members.

3. A transformer unit as defined in claim 1, wherein said second means includes a firebox member, said firebox member having integral heat exchanger means including a plurality of heat dissipating fin members, and further including a cover member having a pair of flaps mounted to said cover member for relative movement thereabout, each said flap movable between an extended position, clearing said main casing top mouth and defining foodstuff supporting tablets, to a retracted position, closing one half of said main casing top mouth whereby both said flaps in their retracted positions close all of said main casing top mouth, one of said flaps having a through bore for through passage of said flue means, whereby a cooking oven is defined.

4. A transformer unit as defined in claim 1, wherein said third means includes a fork rod member, power means for power rotating said fork rod member horizontally above said main frame enclosure, and pan means mounted within said enclosure between said fork rod member and said tray for collecting roasting by-products from said fork rod member.

5. A transformer unit as defined in claim 1, wherein said fourth means includes a cover member having a pair of flaps mounted to said cover member for relative movement thereabout, each said flap movable between an extended position, clearing said main casing top mouth, to a retracted position, closing one half of said main casing top mouth whereby both said flaps in their retracted positions close all of said main casing top mouth, one of said flaps having a through bore for through passage of said flue means; and further including bracket means integral to said main frame, and grill members, supported by said bracket means in generally horizontal spaced condition within said main frame enclosure for supporting foodstuff to be cooked, as a barbecue grill.

6. A transformer unit as defined in claim 1, wherein said fifth means includes a cover member having a pair of flaps mounted to said cover member for relative movement thereabout, each said flap movable between an extended position, clearing said main casing top mouth, to a retracted position, closing one half of said main casing top mouth whereby both said flaps in their retracted positions close all of said main casing top mouth, one of said flaps having a through bore for through passage of said flue means; and further including a pilot means, mounted within said main frame enclosure proximate said heat generating means, and a smoke generating material, to be warmed by said pilot means for generating smoke within said enclosure, said flue means for further escape of smoke generated from said smoke generating material warmed by said heat generating means; and further including grills, mounted in spaced horizontal fashion by mounting means to said main frame within said main frame enclosure above said smoking unit, so as to enable smoking of foodstuff to be supported by said grills.

\* \* \* \* \*